(12) United States Patent
Qi (10) Patent No.: US 11,736,181 B2
(45) Date of Patent: Aug. 22, 2023

(54) CONFIGURATION FOR NON-LINE OF SIGHT LINKS (71) Applicant: Samsung Electronics Co., Ltd., Suwon-si (KR)

(72) Inventor: Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/444,462

(22) Filed: Aug. 4, 2021

(65) Prior Publication Data
US 2022/0045739 A1 Feb. 10, 2022

(30) Foreign Application Priority Data
Aug. 4, 2020 (GB) .................................... 2012107

(51) Int. Cl.
*H04B 7/08* (2006.01)
*H04W 76/10* (2018.01)
*H04L 5/00* (2006.01)

(52) U.S. Cl.
CPC ......... *H04B 7/0897* (2013.01); *H04B 7/0888* (2013.01); *H04W 76/10* (2018.02); *H04L 5/0048* (2013.01)

(58) Field of Classification Search
CPC .. H04B 7/0897; H04B 7/0888; H04B 7/0617; H04W 76/10; H04W 64/00; H04W 24/02; H04W 24/10; H04L 5/0048; H04L 5/0035; H04L 5/0023; G01S 5/02
See application file for complete search history.

(56) References Cited

U.S. PATENT DOCUMENTS

| 5,974,329 A | 10/1999 | Wylie et al. |
| 2017/0195938 A1* | 7/2017 | Gomadam ............ H04W 40/12 |
| 2020/0178038 A1 | 6/2020 | Wang et al. |
| 2021/0235359 A1* | 7/2021 | Caporal Del Barrio ..................... H04L 25/0204 |

FOREIGN PATENT DOCUMENTS

| CN | 102256353 A | 11/2011 |
| CN | 105979583 A | 9/2016 |
| WO | 2020/067964 A1 | 4/2020 |
| WO | 2020/069083 A1 | 4/2020 |
| WO | 2020067840 A1 | 4/2020 |

(Continued)

OTHER PUBLICATIONS

Combined Search and Examination Report dated Jan. 21, 2021, from the Intellectual Property Office of the United Kingdom, in connection with United Kingdom Patent Application No. 2012107. 5, 5 pages.

(Continued)

*Primary Examiner* — Jean B Corrielus (57) ABSTRACT

The present disclosure relates to a pre-5th generation (5G) or 5G communication system to be provided for supporting higher data rates beyond 4th generation (4G) communication system such as long term evolution (LTE). Disclosed is a method of identifying non-Line of Sight, NLOS, links between entities in a telecommunication network, comprising the steps of: determining if the link is NLOS and signaling from a first entity to a second entity a result of the determination by means of a parameter indicative of NLOS.

15 Claims, 5 Drawing Sheets (56) References Cited

FOREIGN PATENT DOCUMENTS

| WO | 2020/164743 A1 | 8/2020 | |
|----|----|----|----|
| WO | WO-2020229902 A1 * | 11/2020 | ........... G01S 5/0036 |
| WO | WO-2021228394 A1 * | 11/2021 | |

OTHER PUBLICATIONS

International Search Report and Written Opinion of the International Searching Authority in connection with International Application No. PCT/KR2021/010293 dated Nov. 19, 2021, 7 pages.

* cited by examiner

CONFIGURATION FOR NON-LINE OF SIGHT LINKS

CROSS-REFERENCE TO RELATED APPLICATION

This application is based on and claims priority under 35 U.S.C. 119(a) of a United Kingdom patent application number 2012107.5 filed on Aug. 4, 2020, in the United Kingdom Intellectual Property Office, the disclosure of each of which is incorporated by reference herein in its entirety.

BACKGROUND

1. Field

The present disclosure relates to improvements in positioning related to mobile devices. It relates, in particular, to mobile devices operating in an Internet of Things (IoT) environment. Further, it relates more particularly to Industrial IoT (IIoT) devices. Issues can arise in terms of positioning accuracy, latency and power consumption in connection with IIoT devices.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In IIoT settings, significant issues can occur due to non-Line of Sight (NLOS) links which occur due to objects positioned between a base station (gNB) and a User Equipment (UE), so that any transmissions between the two are subject to reflections and indirect paths. Such issues can significantly degrade positioning accuracy It is an aim of embodiments of the present disclosure to address shortcomings and other issues in the prior art, whether mentioned herein or not.

SUMMARY

According to the present disclosure there is provided an apparatus and method as set forth in the appended claims.

Other features of the disclosure will be apparent from the dependent claims, and the description which follows.

Although a few preferred embodiments of the present disclosure have been shown and described, it will be appreciated by those skilled in the art that various changes and modifications might be made without departing from the scope of the disclosure, as defined in the appended claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a better understanding of the disclosure, and to show how embodiments of the same may be carried into effect, reference will now be made, by way of example only, to the accompanying diagrammatic drawings in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure provide a means of identifying NLOS links so that actions may be taken in other areas of network planning and operation to take account of such links and improve network performance accordingly.

In downlink, DL, NLOS link identification can be performed either at the UE side or at the gNB side. If the identification is at the UE side, Angle of Departure, AoD, from the gNB is signaled to the UE. It can be signaled as angle or as a beam index, which implicitly includes angle information. If the beam index is signaled, the baseline beam direction needs to be signaled to the UE so that the UE can derive the AoD from the beam index.

As described in co-pending application GB 1914038.3, the UE can then measure Angle of Arrival, AoA, and use such information together with the AoD and its own orientation obtained from other positioning methods to judge if the current link is Line of Sight, LOS, or NLOS. If it is NLOS, then further action can be taken to mitigate any adverse effects which may be experienced. Some of these further actions are set out in the aforementioned earlier application. In any event, the focus of embodiments of the present disclosure is on identifying NLOS links, rather than on the action(s) which may be taken subsequently.

Figure 1:
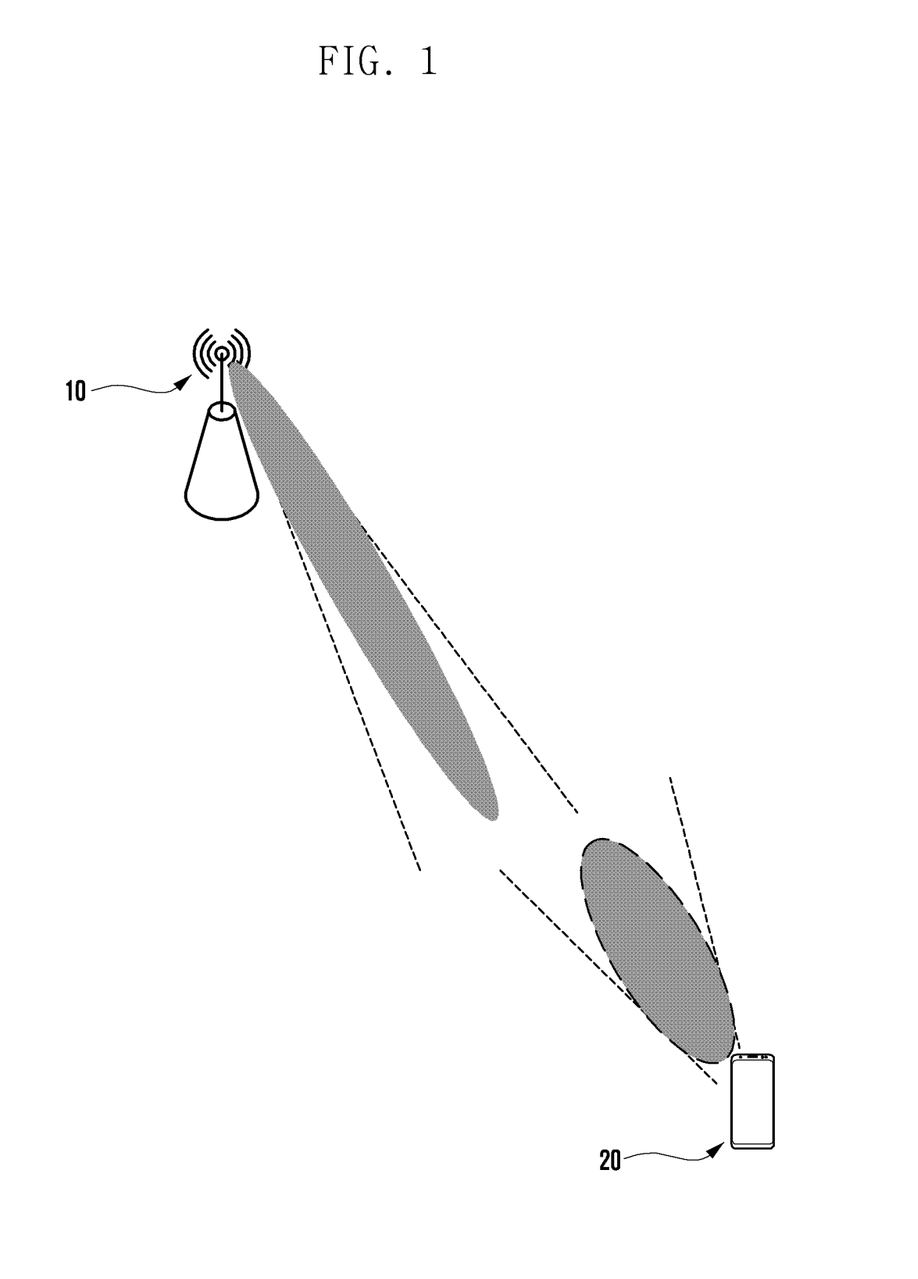
FIG. 1 illustrates the effect of beam width on angle of arrival.

In an ideal case where each beam is extremely narrow, the LOS/NLOS identification can be quite accurate. However, since the beam is not always narrow, AoD from the gNB and AoA at the UE do not always perfectly match as shown in FIG. 1, which shows a non-exact alignment of the beam from gNB 10 and the reception beam at the UE 20. Here, there is a LOS link between the gNB 10 and UE 20. However, due to the beam width, the AoD and AoA matching is not perfect.

In such a case, a parameter is introduced to indicate a degree of confidence of the NLOS identification. Several options are possible.

In a first option, a hard confidence indication is provided. Here, the UE only indicates if the current link is NLOS or LOS. The UE does this by comparing the difference between the AoD and the AoA. If the difference is lower than a threshold, which can either be pre-defined or signaled by upper layer signaling, then the UE indicates LOS. Otherwise, it indicates NLOS.

In a second option, a soft confidence indication is provided. Here, the UE only indicates the likelihood of NLOS/LOS by signalling the difference between the AoD and the AoA. There are two further sub-options associate with this option. Firstly, the UE signals the difference between the AoD and the AoA directly to the gNB. Secondly, the UE signals the confidence level based on the difference between the AoD and the AoA.

If the LOS/NLOS determination happens at the gNB side, the following information is signaled by the UE, AoA UE orientation.

Once the gNB performs the LOS/NLOS determination, it reports such information to the location server and the previously mentioned schemes (i.e., hard/soft confidence) for the UE indication can also be used.

The UE needs to report measurement results to the gNB, and the gNB also needs to report such information to the location server. The confidence of NLOS identification can be associated with one or multiple PRS resources, such as signal configuration, pattern etc. For IoT devices, it is desirable for signaling overhead to be reduced and the reporting of such confidence levels introduces an extra signaling overhead. In order to limit the signaling overhead, various options are available for reporting.

In a first option, the UE reports measurement results and confidence of NLOS for all PRS. In such a case, the reporting overhead is the largest.

In a second option, the UE only reports the measurements results and confidence of a subset of all PRS resources. If the measurement results and confidence of NLOS of a particular PRS resource transmitted by the gNB is not received by the gNB, the gNB can assume the link is an NLOS link and the measurement results cannot be used. A threshold (either pre-defined or configured by upper layer signaling) can be used at the UE. Only the measurement results of the PRS resources with higher confidence of NLOS are reported to the gNB to reduce the reporting signaling overhead.

In a third option, in the case of a hard confidence indication, the UE only reports measurement results of the PRS resources with LOS links. There is no need to report confidence of NLOS in such a case because all reported links are assumed to be LOS links.

It should be noted that even though the above is focused on UE reporting only, the same principles may also be used for gNB reporting to the location server.

In Uplink, UL, the same NLOS identification schemes mentioned above in relation to DL can also be used. Additionally, an embodiment of the present disclosure provides a novel algorithm to identify NLOS links using an UL positioning reference signal, PRS e.g., SRS, the Sounding Reference Signal. Here, positioning reference signal in the uplink refers, preferably, to SRS, but may refer to one or more other suitable signals. Any reference to UL PRS should be construed accordingly and may not refer to DL PRS.

Figure 2:
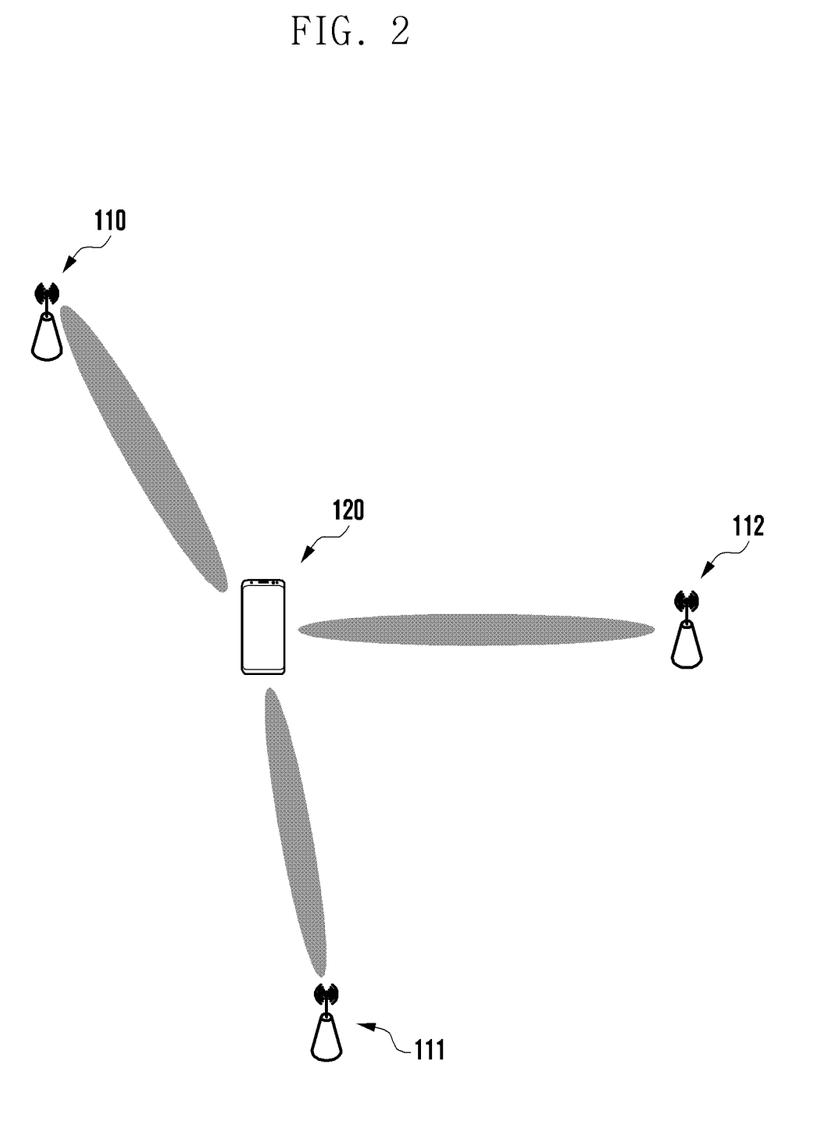
FIG. 2 illustrates a UE and associated angles of arrival of signals from three gNBs.

As shown in FIG. 2, the UE 120 can be located by using AoA of the UL PRS from the UE 120 from multiple (at least 3) gNBs 110, 111, 112 if all the links are LOS links. The location is determined to be the crossing point of all the links. This is clear from FIG. 2.

However, if one of the links shown in FIG. 2 is actually an NLOS link, then it is not possible to guarantee UE location and there is an area of ambiguity as a result of NLOS link.

Figure 3:
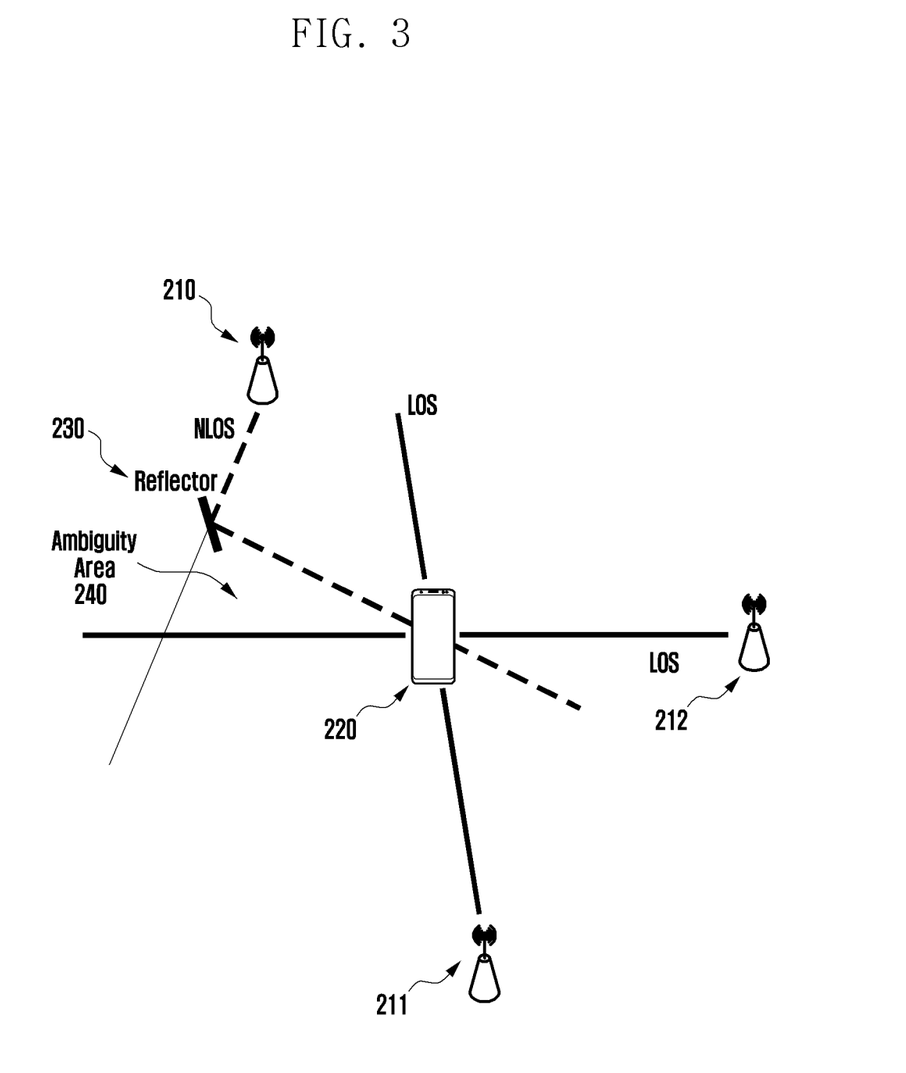
FIG. 3 illustrates the effect of a reflector to yield a NLOS link.

FIG. 3 shows a similar scenario to that shown in FIG. 2 except one of the links is now NLOS due to a reflector 230. UE 220 is able to receive LOS transmissions from two gNBs 211, 212. However, the transmission from gNB 210 is received only after being reflected from reflector 230. Reflector 230 could be a building or any structure.

As shown in FIG. 3, the link from gNB 210 is an NLOS link (shown partially dashed) and, because of this link, there is no longer a crossing point for all three links from gNBs 210, 211, 212. Instead, there is an ambiguity area 240 formed by the three links as illustrated. The UE 220 location is at the edge of the ambiguity area 240. It can be easily inferred that the area of AA is proportional to the positioning error. The following algorithm can be used, based on ambiguity area:

Step 1: Multiple gNBs 110, 111, 112 measure AoA from the UE.

Step 2: divide all gNBs into multiple subsets as G1={B1, ..., Bn1}, G2={Bn1+1, ..., Bn2}, ..., Gk={Bnk, ... Bn}. As shown in FIG. 3, only a single group is shown, wherein B1=210, B2=211. B3=212. If other gNBs are available, then they are arranged into subsets as shown.

Step 3: Each group G calculates area of AA based on AoA measurements, taking into account the known position of the gNB in question.

Step 4: If the area of AA of group Gi is smaller than a threshold (either predefined or configured), the gNB assumes all the links are LOS links. Otherwise, the gNB assumes there is at least one NLOS link in group Gi.

Step 5: Differentiate all groups into LOS group and NLOS group. For the NLOS group, repeat Step 2 to Step 4 until there are enough LOS links to locate the UE. Once this is complete, or if there is not enough info to complete this step, then the algorithm can be stopped.

By making use of an embodiment of the present disclosure, the network is provided with better information regarding the nature (LOS/NLOS) of a particular link between a UE and a gNB, enabling resources to be adapted to the particular circumstances and therefore provide better positioning performance within the network.

Figure 4:
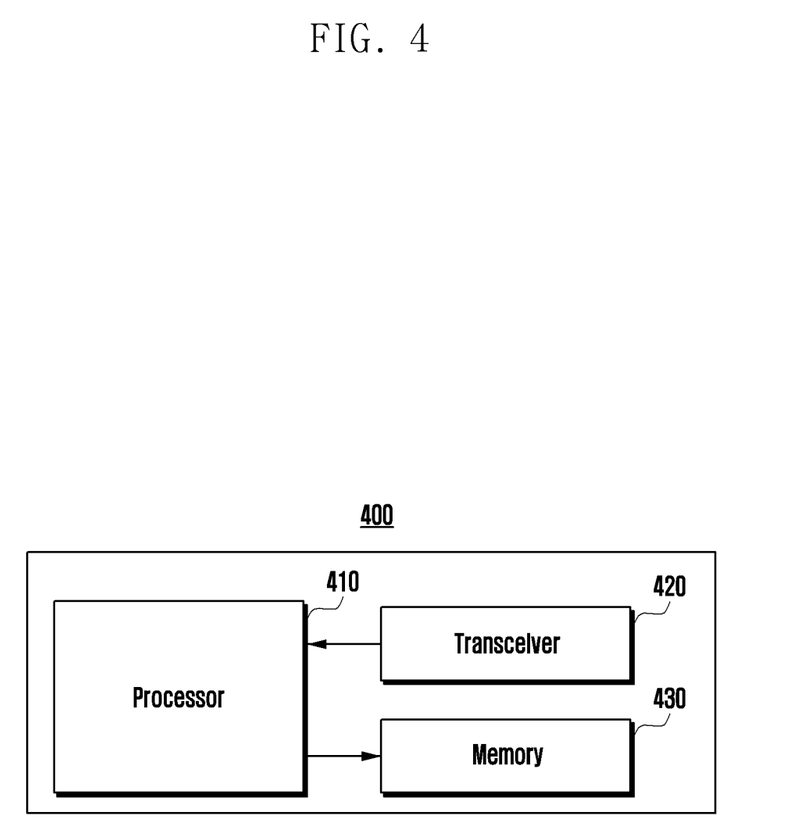
FIG. 4 illustrates a user equipment (UE) according to embodiments of the present disclosure.

FIG. 4 illustrates a user equipment (UE) according to embodiments of the present disclosure. Referring to FIG. 4, the UE 400 may include a processor 410, a transceiver 420 and a memory 430. However, all of the illustrated components are not essential. The UE 400 may be implemented by more or less components than those illustrated in FIG. 4. In addition, the processor 410 and the transceiver 420 and the memory 430 may be implemented as a single chip according to another embodiment.

The UE 400 may correspond to the UE described above. For example, the UE 400 may correspond to the UE 20 illustrated in FIG. 1. For example, the UE 400 may correspond to the UE 120 illustrated in FIG. 2. For example, the UE 400 may correspond to the UE 220 illustrated in FIG. 3.

The aforementioned components will now be described in detail.

The processor 410 may include one or more processors or other processing devices that control the proposed function, process, and/or method. Operation of the UE 400 may be implemented by the processor 410.

The transceiver 420 may include an RF transmitter for up-converting and amplifying a transmitted signal, and an RF receiver for down-converting a frequency of a received signal. However, according to another embodiment, the transceiver 420 may be implemented by more or less components than those illustrated in components.

The transceiver 420 may be connected to the processor 410 and transmit and/or receive a signal. The signal may include control information and data. In addition, the transceiver 420 may receive the signal through a wireless channel and output the signal to the processor 410. The transceiver 420 may transmit a signal output from the processor 410 through the wireless channel.

The memory 430 may store the control information or the data included in a signal obtained by the UE 400. The memory 430 may be connected to the processor 410 and store at least one instruction or a protocol or a parameter for the proposed function, process, and/or method. The memory 430 may include read-only memory (ROM) and/or random access memory (RAM) and/or hard disk and/or CD-ROM and/or DVD and/or other storage devices.

Figure 5:
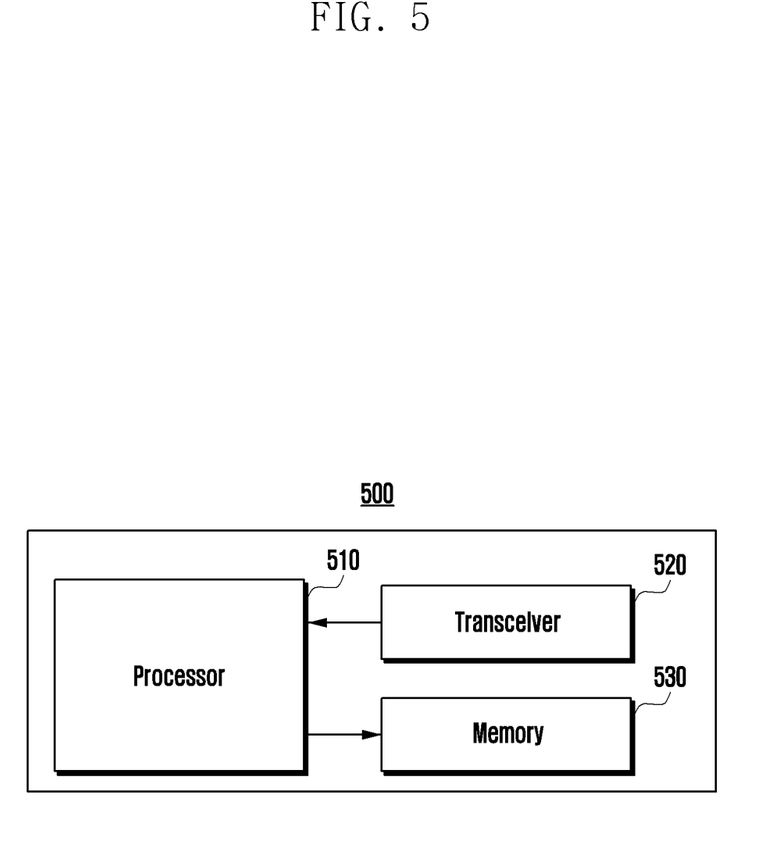
FIG. 5 illustrates a base station according to embodiments of the present disclosure.

FIG. 5 illustrates a base station according to embodiments of the present disclosure. Referring to FIG. 5, the base station 500 may include a processor 510, a transceiver 520 and a memory 530. However, all of the illustrated components are not essential. The base station 500 may be implemented by more or less components than those illustrated in FIG. 5. In addition, the processor 510 and the transceiver 520 and the memory 530 may be implemented as a single chip according to another embodiment.

The base station 500 may correspond to the gNB described above. For example, the base station 500 may correspond to gNB 10 illustrated in FIG. 1. For example, the base station 500 may correspond to gNB 110, 111, 112, illustrated in FIG. 2. For example, the base station 500 may correspond to gNB 210, 211, 212.

The aforementioned components will now be described in detail.

The processor 510 may include one or more processors or other processing devices that control the proposed function, process, and/or method. Operation of the base station 500 may be implemented by the processor 510.

The transceiver 520 may include an RF transmitter for up-converting and amplifying a transmitted signal, and an RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the base station 500. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CD-ROM and/or DVD and/or other storage devices.

Although this disclosure has been described with an exemplary embodiment, various changes and modifications may be suggested to one skilled in the art. It is intended that this disclosure encompass such changes and modifications as fall within the scope of the appended claims.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first entity in a communication network, the method comprising:
   identifying whether a path between the first entity and a second entity is non-line of sight (NLOS) or line of sight (LOS); and
   transmitting, to the second entity, information for indicating the LOS or the NLOS associated with the path based on the identification,
   wherein the information comprises a hard indication or a soft indication,
   wherein in case that the information comprises the soft indication, a value of the soft indication is associated with a likelihood of the LOS, and
   wherein in case that the information comprises the hard indication, a value of the hard indication indicates either the LOS or the NLOS.

2. The method of claim 1, wherein the soft indication includes a numerical value indicating a difference between an angle of arrival and an angle of departure.

3. The method of claim 1, wherein either the first entity is a user equipment (UE) and the second entity is a base station (gNB), or the first entity is the gNB and the second entity is the UE.

4. The method of claim 1, wherein whether the path is the NLOS is determined based on a reference signal, and
   wherein, in a downlink case, the reference signal is a positioning reference signal (PRS) and, in an uplink case, the reference signal is a sounding reference signal (SRS).

5. The method of claim 1, wherein the information is further reported to a location server.

6. The method of claim 1, further comprising:
   reporting, to the second entity, measurement results for a subset of a plurality of reference signals associated with the identification.

7. The method of claim 1, wherein a plurality of first entities is base stations (gNBs) and the second entity is a user equipment (UE), the method further comprising:
   a) at each of the plurality of the first entities (gNBs), measuring a value of an angle of arrival (AoA) from the UE;
   b) dividing the plurality of the gNBs into at least one subset and each subset determines an ambiguity area based on the measured value of the AoA; and
   c) in case that an area of the ambiguity area is smaller than a threshold, all paths associated with the plurality of the gNBs in the subset are determined as the LOS, otherwise at least one path in the subset is the NLOS.

8. The method of claim 7, further comprising:
   arranging the at least one subset into LOS subsets and NLOS subsets and, for each NLOS subset, repeating steps b) and c) until sufficient LOS paths are identified to locate the UE.

9. The method of claim 1, further comprising:
   in case that an area of an ambiguity area of a subgroup is smaller than a threshold, identifying that all paths of the subgroup are the LOS,
   wherein the first entity is a base station and belongs to the subgroup comprising a plurality of base stations, and the second entity is a user equipment (UE), and
   wherein the area of the ambiguity area of the subgroup is determined based on an angle of arrival (AoA) measurement from the UE.

10. An apparatus comprising a first entity configured to identify non-line of sight (NLOS) paths between entities in a communication network, the apparatus comprising:
    a processor; and
    memory coupled to the processor, the memory comprising instructions that, when executed by the processor, cause the apparatus to:
       identify whether a path between the first entity and a second entity is NLOS or line of sight (LOS), and
       transmit, to the second entity, information for indicating the LOS or the NLOS associated with the path based on the identification,
    wherein the information comprises a hard indication or a soft indication,
    wherein in case that the information comprises the soft indication, a value of the soft indication is associated with likelihood of LOS, and
    wherein in case that the information comprises the hard indication, a value of the hard indication indicates either the LOS or the NLOS.

11. The apparatus of claim 10, wherein the soft indication includes a numerical value indicating a difference between an angle of arrival and an angle of departure.

12. The apparatus of claim 10, wherein either the first entity is a user equipment (UE) and the second entity is a base station, or the first entity is the base station and the second entity is the UE.

13. The apparatus of claim 10,
   wherein whether the path is the NLOS is determined based on a reference signal, and
   wherein, in a downlink case, the reference signal is a positioning reference signal (PRS) and, in an uplink case, the reference signal is a sounding reference signal (SRS).

14. The apparatus of claim 10, wherein the instructions, when executed by the processor, cause the apparatus to report the information to a location server.

15. The apparatus of claim 10, wherein the instructions, when executed by the processor, cause the apparatus to report, to the second entity, measurement results for a subset of a plurality of reference signals associated with the identification.

* * * * *